US009251170B2

(12) United States Patent
Moore et al.

(10) Patent No.: US 9,251,170 B2
(45) Date of Patent: Feb. 2, 2016

(54) METHOD AND SYSTEM FOR ITEM SELECTION BASED ON CHARACTERISTIC MATCHING

(75) Inventors: Devin C. Moore, Lewis Center, OH (US); Wade Peebles Thompson, Moore, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 787 days.

(21) Appl. No.: 13/299,159

(22) Filed: Nov. 17, 2011

(65) Prior Publication Data
US 2013/0127892 A1    May 23, 2013

(51) Int. Cl.
*G09G 5/00* (2006.01)
*G06F 17/30* (2006.01)
*G06T 11/00* (2006.01)
*G06Q 30/02* (2012.01)

(52) U.S. Cl.
CPC ...... *G06F 17/30247* (2013.01); *G06Q 30/0282* (2013.01); *G06T 11/001* (2013.01)

(58) Field of Classification Search
USPC ......................................................... 382/164
See application file for complete search history.

(56) References Cited

U.S. PATENT DOCUMENTS

| 6,069,696 | A | * | 5/2000 | McQueen et al. | 356/326 |
| 2008/0279481 | A1 | * | 11/2008 | Ando | 382/306 |
| 2009/0063306 | A1 | * | 3/2009 | Fano et al. | 705/28 |
| 2009/0289956 | A1 | * | 11/2009 | Douris et al. | 345/633 |

OTHER PUBLICATIONS

Zhu, W. Design of the PromoPad: an Automated Augmented Reality Shopping Assistant. ,Dec. 2006, 12th Americas Conference on Information Systems, Acapulco, Mexico, p. 1-16.*

* cited by examiner

*Primary Examiner* — Stephen R Koziol
*Assistant Examiner* — Robert Craddock

(57) ABSTRACT

An approach for determining a representation of a physical object, the representation indicating at least one of a color, a texture, and a pattern associated with the object, comparing the representation to one or more reference representations on a basis of at least one of the color, the texture, and the pattern, selecting one of the plurality of reference representations based on the comparison; and determining one or more physical items associated with the one reference representation, is presented.

14 Claims, 11 Drawing Sheets

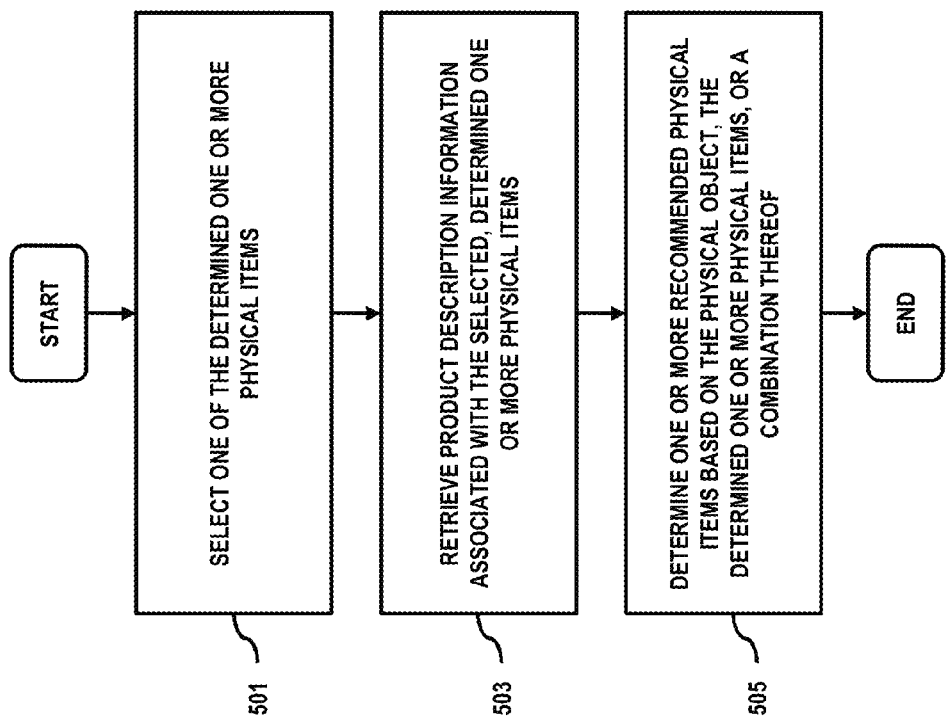

METHOD AND SYSTEM FOR ITEM SELECTION BASED ON CHARACTERISTIC MATCHING

BACKGROUND INFORMATION

With the consumer adoption of mobile devices, such as cellular telephones, laptop computers, personal digital assistants, and the like, these devices have provided an avenue for solving challenges facing consumers. Device manufacturers and service providers are continually seeking applications and services to meet these challenges. With advancements in the manufacturing processes of physical items, such as consumer products, consumers are offered a wider selection of choices concerning characteristics of the products (e.g., color, texture, pattern, and the like). Often, differences between characteristics can be so subtle as to be indiscernible by the average consumer. Moreover, different vendors of consumer products often have their own unique system for identifying the various characteristics, making matching between vendors of consumer products on the basis of the characteristic more difficult. By way of example, paint vendors often have their own naming system for the various paints they produce, and matching paints between vendors is often based on merely a visual, side-by-side inspection of the paints. Where one of the paints has already been applied to an object, such as a bedroom wall, it is often more difficult to make the comparison.

Based on the foregoing, there is a need for an approach to develop applications and services for mobile devices with respect to discerning characteristics of items.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5 is a flowchart of a process for selecting an item based on a matched characteristic and determining one or more recommended items, according to an exemplary embodiment;

DESCRIPTION OF THE PREFERRED EMBODIMENT

An apparatus, method, and software for item selection based on characteristic matching, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to matching characteristics, such as color, texture, and pattern, it is contemplated that these embodiments have applicability to matching other characteristics, such as finish, material, etc.

Figure 1:
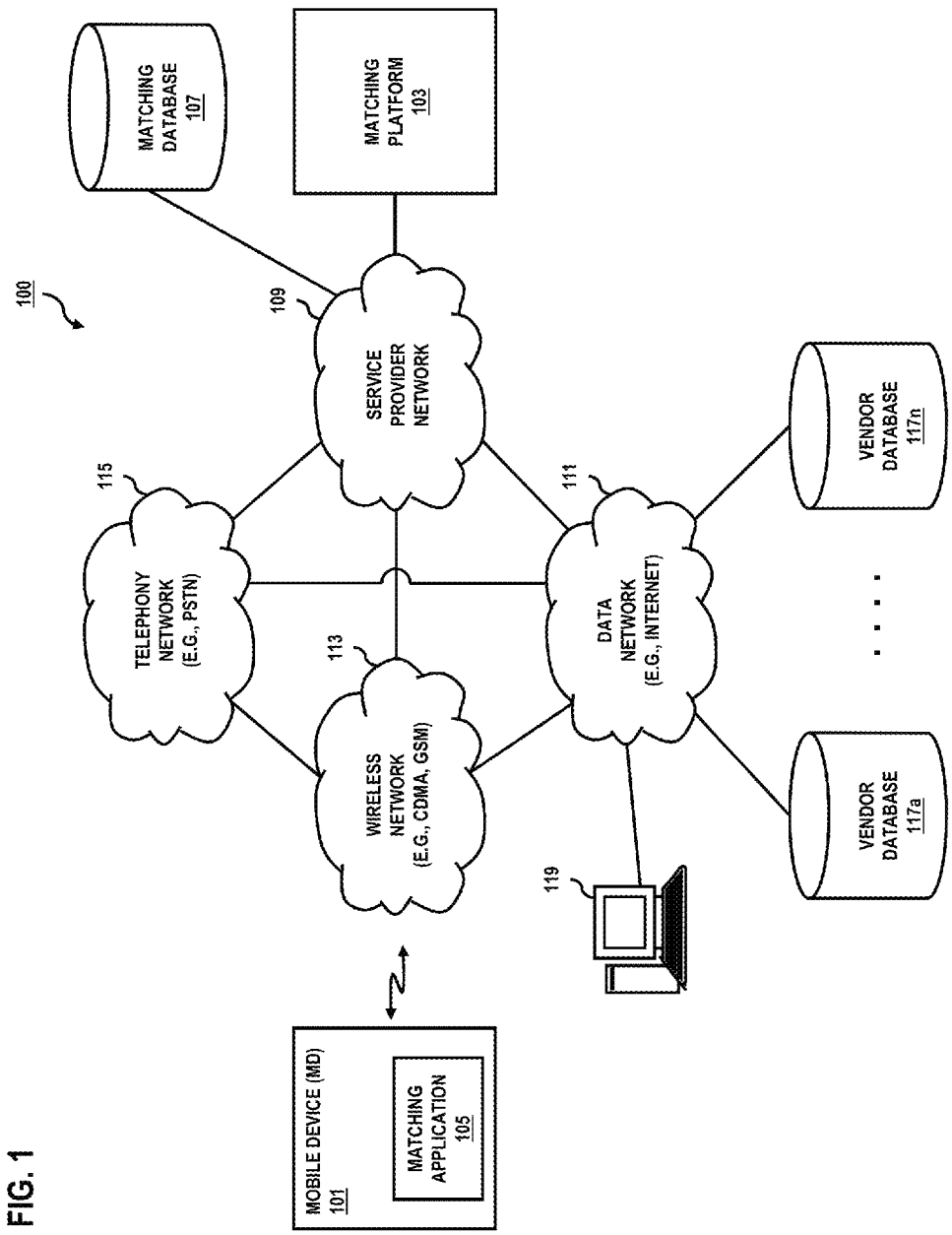
FIG. 1 is a diagram of a system capable of selecting an item based on a matching characteristic, according to an exemplary embodiment.

FIG. 1 is a diagram of a system configured to provide item selection based on characteristic matching, according to an exemplary embodiment. For purpose of illustration, a mechanism for providing item selection based on characteristic matching in a network is described with respect to a communication system 100 that includes a mobile device (MD) 101 with connectivity to a matching platform 103. According to certain embodiments, users at client devices (e.g., MD 101, computing device 119, or another device (not shown)) may access the features and functionalities of the matching platform 103 over one or more networks, such as service provider network 109, data network 111, wireless network 113, and/or telephony network 115 in order to perform item selection based on characteristic matching. While specific reference will be made hereto, it is contemplated that the system 100 may embody many forms and include multiple and/or alternative components and facilities.

The approach of the system 100 stems, in part, from the recognition that consumer devices (e.g., MD 101, computing device 119, etc.) offer functionality that can be applied to many different services with their increasing functionality and, specifically for MD 101, their mobility. The approach of the system 100 also stems, in part, from the recognition that current manufacturing processes of consumer goods associated with, for example, colors, textures, and patterns have greatly increased the number of different options with respect to each characteristic making selection of a matching characteristic for the average consumer difficult. The approach of the system 100 also stems, in part, from the recognition that various independent vendors have not established a uniform system of identifying the different characteristics, thus ever complicating the challenge for a user to select a consumer product (e.g., a physical item) and match the color, texture, or pattern of the consumer product to the color, texture, or pattern of another consumer product (e.g., physical object).

To address these problems and provide item selection based on characteristic matching, the matching platform 103 provides for the ability to determine a representation of a physical object, the representation indicating at least one of a color, a texture, and a pattern associated with the object. By way of example, a user may use the MD 101 to acquire an image of an object and use the image of the object as the representation of the object. By way of a further example, the user may use the MD 101 to acquire a code associated with the object (e.g., machine-readable code, human-readable code) by either acquiring an image of the code or entering in the code into the MD 101. To interface with the matching platform 103, the MD 101 may include a matching application 105 that is used to communicate with the matching platform 103 and is used to provide one or more user interfaces to the MD 101 for the user of the MD 101 to interact with the matching platform 103. However, in one embodiment, the matching platform 103 may be entirely embodied in the matching application 105 running on MD 101.

Upon the matching platform 103 receiving the representation of the object from the MD 101, the matching platform 103 may then compare the representation to one or more reference representations on a basis of at least one of the color, the texture, and the pattern of the representation and select one of the reference representations that match the acquired representation. By way of example, the match may be based on an exact match between a characteristic (e.g., color, texture, pattern, etc.) of the acquired representation and a reference representation. The match also may be based on a closest exact match, a compatible match and/or a coordinated match between the acquired representation and the reference representation. For example, a shade of blue included in the acquired representation may be color-coordinated with a shade of gray in the reference representation. Therefore, based on the selected reference representation, the matching platform 103 may determine one or more consumer products (e.g., any physical item) that are associated with the reference representation, thereby providing consumers with an approach for item selection based on characteristic matching.

By way of example, a user may like a color of paint they see on the wall of a friend's house. Using their MD 101, a user may take an image of a bedroom wall to acquire a representation of the wall that includes the color of the wall. Using the matching platform 103, the user may determine the color of paint on the wall paint associated with one or more paint vendors that matches the color of paint. Thus, without knowing the vendor of the paint used on the wall, without knowing the specific paint identifier for the associated vendor, and without manually comparing the paint on the wall to paint swatches, for example, the user is able to determine the color of paint and one or more paint vendors that sell paint simply by, for example, using their MD 101 and/or computing device 119.

As shown, the system 100 includes the matching platform 103 implemented as, for example, part of a service provider network 109 for providing item identification based on characteristic matching. However, in alternative embodiments, the matching platform 103 could be implemented as any part of the system 100 (e.g., as an application running on the MD 101, as discussed above). The matching platform 103 is associated with a matching database 107 that stores item characteristic information. In one embodiment, the service provider associated with the matching platform 103 determined the physical items (e.g., products) and the characteristics of the items to generate the reference representations. In one embodiment, the matching database 107 may store the characteristic information and reference representations directly, for all of the possible items corresponding to all of the possible products across all of the possible vendors. In one embodiment, the matching database 107 may merely store link information to specific vendor databases 117a-117n (collectively referred to as vendor databases 117) that store the item information corresponding to the products for each specific vendor. In certain embodiments, the matching database 107 may store the associated item and/or product codes corresponding to the items associated with the vendors that the matching platform 103 uses to compare to acquire representations. Where the matching platform 103 is integrated with the MD 101 as an application executed at the MD 101, the MD 101 may store the information contained in the matching database 107, the vendor databases 117, or the combination thereof.

The service provider network 109 can interact with one or more other networks, such as a data network 111, a wireless network 113 and/or a telephony network 115. In one embodiment, the matching platform 103 may interface with the vendor databases 117, the computing device 119, and any other device (not shown) through the data network 111 (e.g., the Internet). In one embodiment, the matching platform 103 may interface with the MD 101 through the wireless network 113. In one embodiment, the matching platform 103 also may interface with the MD 101 through the data network 111 and/or the telephony network 115.

For illustrative purposes, the networks 109-115 may be any suitable wireline and/or wireless network, and be managed by one or more service providers. For example, telephony network 115 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of the system 100. In this manner, networks 109-115 may embody or include portions of a signaling system 7 (SS7) network, or other suitable infrastructure to support control and signaling functions.

By way of example, the components and devices of the system 100 may communicate with each other using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the matching platform 103 allows for capturing an image of the object via the MD 101 and further specifying a region of the image to further specify the representation of the object. By way of example, the user may use the MD 101 to acquire an image of a dress. Either at the matching application 105 prior to transmitting the image to the matching platform 103, or in response to a prompt by the matching platform 103, the user may select a region of the image that the user is particularly interested in. Thus, where, for example, the dress includes multiple different colors, the user may specify the specific region of the dress that includes the specific color the user is interested in.

In one embodiment, the matching platform 103 determines an average of the color, the texture, and/or the pattern associated with the image and/or the region, and the representation of the object indicates the average color, the average texture, and/or the average pattern. Thus, by way of example, where a product (e.g., a physical object) includes multiple different colors, even at a small scale, the matching platform 103 may determine an average of the region that still contains multiple different colors to determine, for example, the overall impression of color that the region represents taking into account all of the colors within the region.

In one embodiment, as briefly described above, the matching platform 103 may determine and use at least one of a human-readable code and a machine-readable code associated with an object as the representation of the object. The human-readable code may correspond to any type of character string including, for example, letters and/or numbers that a user may enter into the matching platform 103 through, for example, the MD 101. The machine-readable code may correspond to any type of machine vision associated with an image (e.g., barcode, UPC, Quick Response (QR) code, ISBN, and the like). The machine-readable code may be acquired through, for example, a camera associated with the MD 101, one or more specialized scanners associated with the MD 101, and/or specialized applications running on the MD 101 for acquiring a machine-readable code. The matching platform 103 may then compare the codes to one or more codes associated with the matching database 107 and/or the vendor databases 117 to determine one or more codes and/or one or more items (e.g., products) corresponding to the acquired codes. In one embodiment, the service provider associated with the matching platform 103 previously acquired and correlated the various human-readable codes and machine-readable codes with all of the possible human-readable codes and/or machine-readable codes associated with the products and the vendors of the products to generate the matching database 107.

Upon determining one or more physical items associated with the reference representation, the matching platform 103 may retrieve product description information associated with the one or more determined physical items. The product description information may include, for example, vendor information associated with the products, the specific human-readable codes and machine-readable codes associated with the products across one or more vendors, pricing information, purchasing information, and the like. The matching platform 103 may provide the information via the MD 101 to the user by one or more user interfaces generated by the matching platform 103.

In one embodiment, the matching platform 103 may determine one or more recommended physical items based on the physical object for which the representation was originally acquired, the determined one or more physical items, or a combination thereof. By way of example, where one of the determined physical items corresponds to a product associated with a vendor, the vendor may have provided information corresponding to other products that may be associated with the product. Such an example may arise where the determined physical item is a chair, and the vendor of the chair has provided recommendation information for a desk that is part of a set associated with the chair. The set may be based on, for example, the color of the chair and the desk, the texture of the chair and desk, and/or the pattern of wood grain used for the chair and the desk. The matching platform 103 may provide the recommendation information so that the user can select a matching, recommended object.

Figure 2:
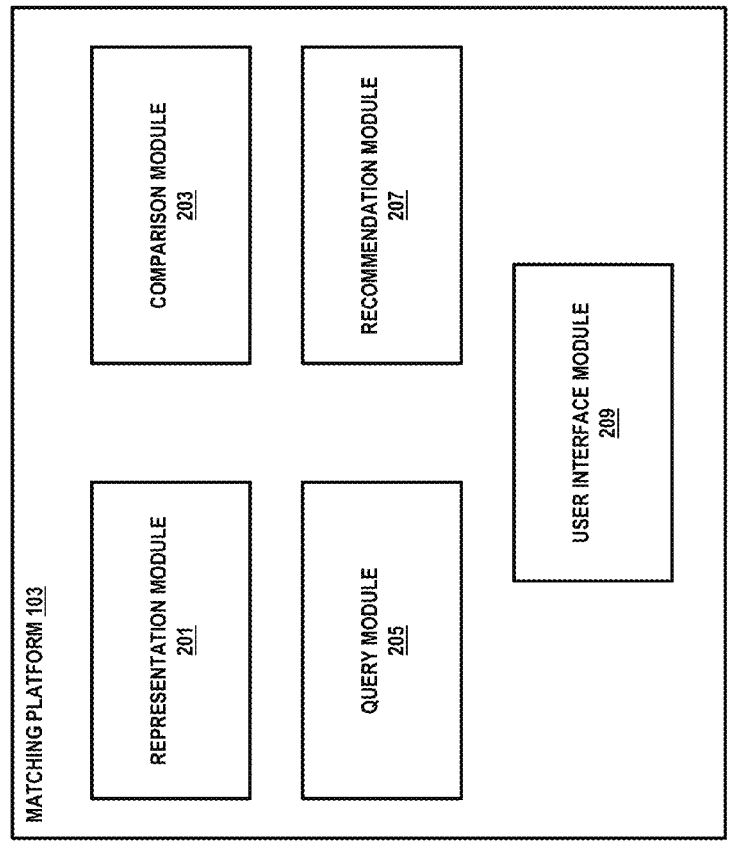
FIG. 2 is a diagram of a matching platform capable of selecting an item based on a matching characteristic, according to an exemplary embodiment.

FIG. 2 is a diagram of the components of a matching platform 103, according to an exemplary embodiment. By way of example, the matching platform 103 includes one or more components for providing item selection based on characteristic matching. It is contemplated that the functions of these components may be combined in one or more components or performed by other components of equivalent functionality. In one embodiment, the matching platform 103 includes a representation module 201, a comparison module 203, a query module 205, a recommendation module 207, and a user interface module 209.

In one embodiment, the representation module 201 determines a representation of a physical object, the representation indicating at least one of a color, a texture, and a pattern associated with the object. The object may, for example, constitute any object that has a color, a texture, or a pattern associated with the object, such as a product offered for sale or previously sold by a vendor. The object may also represent a medium for displaying the product associated with a vendor, such as a wall associated with a particular paint or a dress associated with a color, texture, or pattern. The representation may be an image, a region of an image, a human-readable code, a machine-readable code, or a combination thereof. By way of example, the representation may be an image of a machine-readable code that is processed by the matching platform 103 to determine the associated color, texture, or pattern associated with the object. The image and/or the region of the image may be two-dimensional or three-dimensional. The region of the image may be any portion of an acquired image that is selected by the user. Where the image or the region of the image includes one or more colors, textures, or patterns, the representation module 201 may determine an average of the region to determine an average of the color, texture, or pattern. In one embodiment, the representation includes a selection of the color, texture, or pattern as defined by the user that acquired the representation as the characteristic by which to match reference representations, and, accordingly, physical items. The representation module 201 processes the selection to determine the characteristic of the representation to focus on when determining a matching item. In one embodiment, the representation module 201 automatically determines the characteristic to focus on based on, for example, only one characteristic being detectable in the representation (e.g., only a color is in an image, only a texture is associated with a human-readable code, etc.).

By way of example, the matching platform 103 receives an image of a wall and associated paint on the wall acquired by the user using the MD 101's associated camera. By way of another example, the matching platform 103 receives an image from a website of a dress, the image including the characteristic of the pattern of the fabric used in manufacturing the dress. By way of another example, the matching platform 103 receives an image of a machine-readable code acquired by the user using the MD 101's camera, the machine-readable code including the characteristic of the texture of a type of brick. The representation module 201 may further process the image to determine the code associated with the image.

Upon receiving the representation of the object, the representation module 201 processes the representation to generate the one or more codes and/or character strings used by the matching platform 103 for subsequent processing. By way of example, for the representation of the image of the wall of paint, the representation module 201 determines the color of the paint based one or more color schemes (e.g., RGB, Pantone®, etc.) by graphically processing the image. By way of example, for the representation of the dress, the representation module 201 determines the pattern of the fabric by graphically processing of the image. For the machine-readable code associated with the brick, the representation module 201 determines a character string associated with the machine-readable code based on a graphical processing of the image of the brick.

In one embodiment, the comparison module 203 compares the representation of the object determined by the representation module 201 to the one or more reference representations on basis of the color, the texture, and the pattern. The basis for the comparison may be included within the request to the matching platform 103. The representation module 201 and/or the comparison module 203 also may determine the basis based on, for example, the representation including only one characteristic (e.g., only color). The comparison module 203 compares the representation to the reference representations stored in, for example, the matching database 107. Based on the comparison, the comparison module 203 selects one of the reference representations based on, for example, a match between the representation of the object and the reference representation. The match may be based on, for example, an exact match, a closest exact match, a compatible match, and/or a coordinated match.

In one embodiment, the query module 205 queries for one or more physical items associated with the selected one reference representation. In one embodiment, where information associated with the one or more physical items is stored in the matching database 107, the query module 205 queries the matching database 107 for the one or more physical items. In one embodiment, where the information associated with the one or more physical items is stored in the vendor databases 117, the query module 205 may query the vendor databases 117 directly, or may first query the matching database 107 and then query the vendor databases 117.

In one embodiment, the query module 205 queries the databases for specific items defined by the request sent to the matching platform 103 associated with the representation. The specific items may be defined by, for example, a category of items, such as clothing, house wares, furniture, and the like. By way of example, the object associated with the representation is a dress and the user that transmitted the representation to the matching platform 103 limited the queried items to shoes that match the color of the dress. Thus, when the query module 205 queries the databases for items that match, for example, the color of the dress, the query module 205 also limits the query to the category of shoes. In one embodiment, the query module 205 returns the results of the matching physical items along with product description information associated one or more physical items. The product description information may include any type of information associated with the physical items, such as associated vendor information, pricing information, purchasing information, and the like.

In one embodiment, the recommendation module 207 recommends one or more physical items based on the physical object associated with the original representation, the determined one or more physical items, or a combination thereof. Thus, upon querying the databases and receiving one or more physical items that match the queried representation, the recommendation module 207 may recommend one or more of the physical items according to one or more recommendations created by the one or more vendors, the service provider associated with the matching platform 103, or a combination thereof. By way of example, the vendor associated with the physical object may include recommendation information such that items associated with the physical object are recommended to the user above other items that may otherwise match the queried representation. For example, a vendor associated with a dress that represents the physical object may recommend a certain pair of shoes to pair with the dress. Alternatively, the recommendation may be associated with an alternative vendor than the vendor that is associated with the physical object. The recommendation may be based on any one or all of the characteristics of color, pattern, and texture, and based on any one of an exact match, a closest match, a coordinated match, and a compatible match.

In one embodiment, the user interface module 209 interfaces with the matching application 105 at the MD 101 to render the various user interfaces at the MD 101 that the user interacts with in interfacing with the matching platform 103. By way of example, the user interface module 209 renders one or more user interfaces used in acquiring images associated with objects, used in selecting a region of an image associated with the representation of the object, and the returned results of the physical items and product description information associated with the objects.

Figure 3:
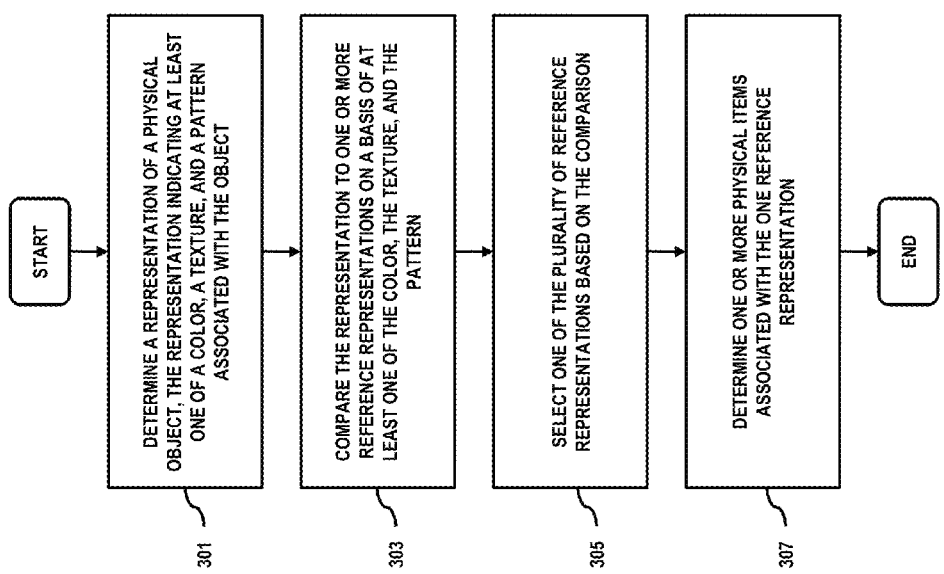
FIG. 3 is a flowchart of a process for selecting an item based on a matching characteristic, according to an exemplary embodiment.

FIG. 3 is a flowchart of a process for selecting an item based on a matching characteristic, according to an exemplary embodiment. In one embodiment, the matching platform 103 performs the process 300 of FIG. 3. In step 301, the matching platform 103 determines a representation of a physical object. The representation of the physical object may be received by the matching platform 103 from the MD 101, the computing device 119, or any other device (not shown) that is part of the system 100. The representation indicates at least one of a color, a texture, and a pattern associated with the object. The request and/or the representation may also include one or more categories associated with the object and/or associated with one or more physical items to be matched to the object. By way of example, the representation may limit the physical items that are returned to only a specific category of physical items that match the representation of the object (e.g., clothing, furniture, house wares, etc.).

By way of example, the representation of the object may be an image of a dress acquired from a website on the Internet. The image may include a color associated with the dress, a pattern associated with the dress, and a texture associated with dress. The representation may alternatively be a string of characters entered by the user at the MD 101 corresponding to an item code, the item code associated with one or more of a specific color, a specific texture, and/or a specific pattern. The representation may alternatively be a machine-readable code scanned by the MD 101 associated with one or more of a specific color, a specific texture, and/or a specific pattern associated with a specific object. The matching platform 103 processes the representation to be able to compare the representation and the characteristic of the color, the texture, and/or the pattern associated with the representation to reference representations.

In step 303, the matching platform 103 compares the representation of the object to one or more reference representations on a basis of the color, the texture, and/or the pattern associated with the representation of the object. The reference representations correspond to representations of one or more physical items that may correspond to one or more products from one or more vendors processed to determine the various characteristics of color, texture, and pattern associated with the physical items.

Based on the comparison, at step 305, the matching platform 103 selects one of the reference representations that match the representation of the object. The match may be based on, for example, an exact match, a closest exact match, a compatible match, or a coordinated match. By way of example, where the representation of the object is associated with the color of a dress, an exact match may correspond to an exact match of the color of the dress, a closest exact match may correspond to a non-identical but next closest match of the color of the dress within a defined color spectrum, a compatible match may correspond to a color that is compatible with the color of the dress based on one or more compatibility thresholds, and the coordinated match may correspond to a color that is coordinated with the color of the dress based on one or more coordination thresholds.

In step 307, the matching platform 103 determines one or more physical items associated with the selected reference representation. The physical items associated with the selected reference representation are the items stored in the matching database 107 and/or the vendor databases 117 that are associated with the selected reference representation. By way of example, where the reference representation is a color, the selected physical items are items that match the color, such as shoes, belts, hats, gloves, etc. that match the color of a dress. In one embodiment, where the request for the physical items matched based on the characteristic includes a category for the physical items, the matching platform 103 restricts the physical items to physical items that both match the reference representation and match the selected category. For example, if the category is shoes, the physical items associated with the representation will be only shoes that match the color of the dress.

Figure 4B:
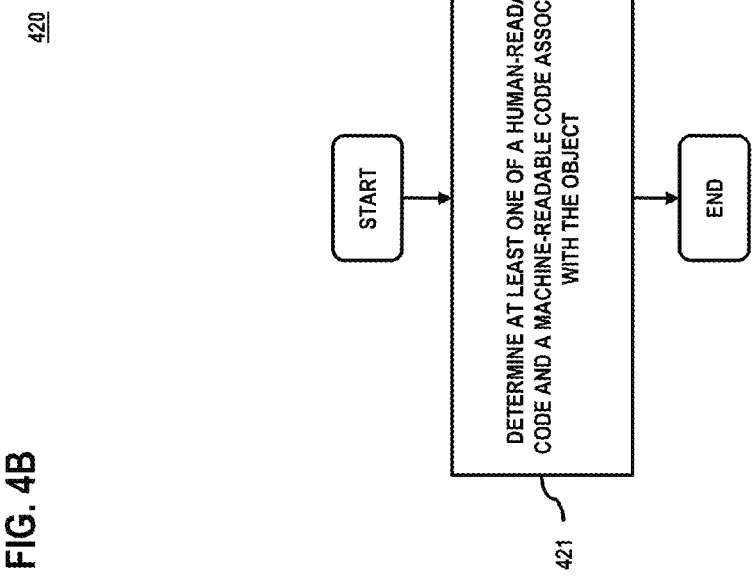
FIGS. 4A and 4B are flowcharts of a process for capturing a representation of an object, according to exemplary embodiments.
Figure 4A:
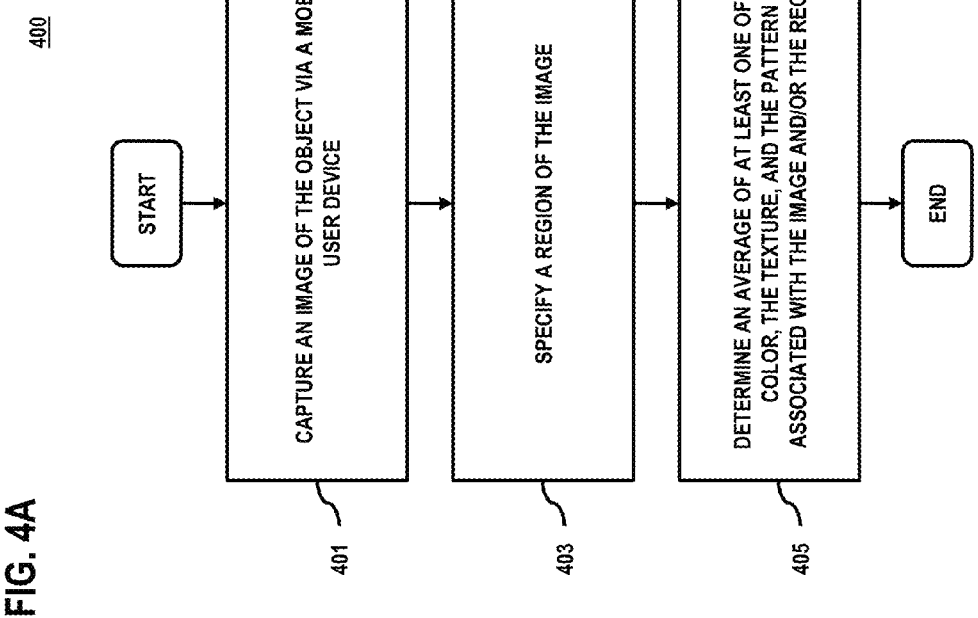

FIG. 4A is a flowchart of a process for capturing an image of an object as the representation of the object, according to an exemplary embodiment. In one embodiment, the matching platform 103 performs the process 400 of FIG. 4A. In step 401, the user of the MD 101 operates the MD 101 to capture an image of the object. The user may operate the MD 101 to capture an image by, for example, using a camera and/or a video camera associated with the MD 101 to capture an image of the object. The user may operate the MD 101 to capture an image by, for example, using the MD 101 to navigate to a website on the Internet that includes an image of the object, or otherwise retrieve a previously captured image of the object. The captured image may be a two-dimensional image and/or a three-dimensional image.

In one embodiment, at step 403, the user may further specify a region of the captured image to more narrowly focus the representation of the object. By way of example, the image may be of a wall that includes one or more fixtures hanging on the wall. The user may specify a region of the image that does not include any of the fixtures hanging on the wall to, for example, avoid the matching platform 103 from erroneously determining the one or more physical items based on the characteristics of the fixtures and the wall, rather than solely the wall.

In one embodiment, at step 405, the matching platform 103 may determine an average of the color, the texture, and/or the pattern associated with the image and/or the region of the image. Thus, in the event that the image or the region of the image includes more than one colors, texture, or patterns, the matching platform 103 may determine an average of the characteristics and perform subsequent processing based on the average. By way of example, if a pair of shoes correspond to the object and the shoes have more than one color, an average of the colors may be determined by the matching platform 103 and used for subsequent processing.

FIG. 4B is a flowchart of a process for capturing a human-readable code and/or a machine-readable code as the representation of an object, according to an exemplary embodiment. In one embodiment, the matching platform 103 performs the process 420 of FIG. 4B. In step 421, the matching platform 103 determines at least one of a human-readable code and/or a machine-readable code associated with the object. The matching platform 103 may determine the code based on, for example, the user entering the code on the MD 101. By way of example, the user may enter a character string using the MD 101 that corresponds to a representation of an object. Alternatively, the matching platform 103 may determine the code based on, for example, the user scanning a barcode using the MD 101. By way of example, the barcode may correspond to a representation of an object. Alternatively, and related to process 400 illustrated in FIG. 4A, the matching platform 103 may determine the code based on the user, for example, acquiring an image of the barcode using a camera associated with the MD 101. By way of example, the image of the barcode may be processed to determine a representation of the object.

FIG. 5 is a flowchart of a process for selecting an item based on a matched representation of a characteristic and determining one or more recommended items, according to an exemplary embodiment. In one embodiment, the matching platform 103 performs the process 500 of FIG. 5. In step 501, after step 307 described above with respect to process 300, a user may select one of the determined one or more physical items that are associated with a representation of the object. For example, the user may use the MD 101 to select one of the determined one or more physical items presented in a list at the MD 101.

In response to the selection, in one embodiment at step 503, the matching platform 103 may retrieve product description information associated with the selected, determined one or more physical items. The product description information may include, for example, vendor information associated with the products, pricing information, purchasing information, and the like. The matching platform 103 may subsequently display the product description information.

In one embodiment, at step 505, the matching platform 103 may determine one or more recommended physical items based on the physical object for which the representation was originally acquired, the determined one or more physical items based on the representation of the object, or a combination thereof. By way of example, where one of the determined physical items corresponds to a product associated with a vendor, the vendor may have provided information corresponding to other products that may be associated with the product. Such an example may arise where the determined physical item is a chair, and the vendor of the chair has provided recommendation information for a desk that is part of a set associated with the chair. The set may be based on, for example, the matching color of the chair and the desk, the matching texture of the chair and desk, and/or the matching pattern of wood grain used for the chair and the desk.

Figure 6A:
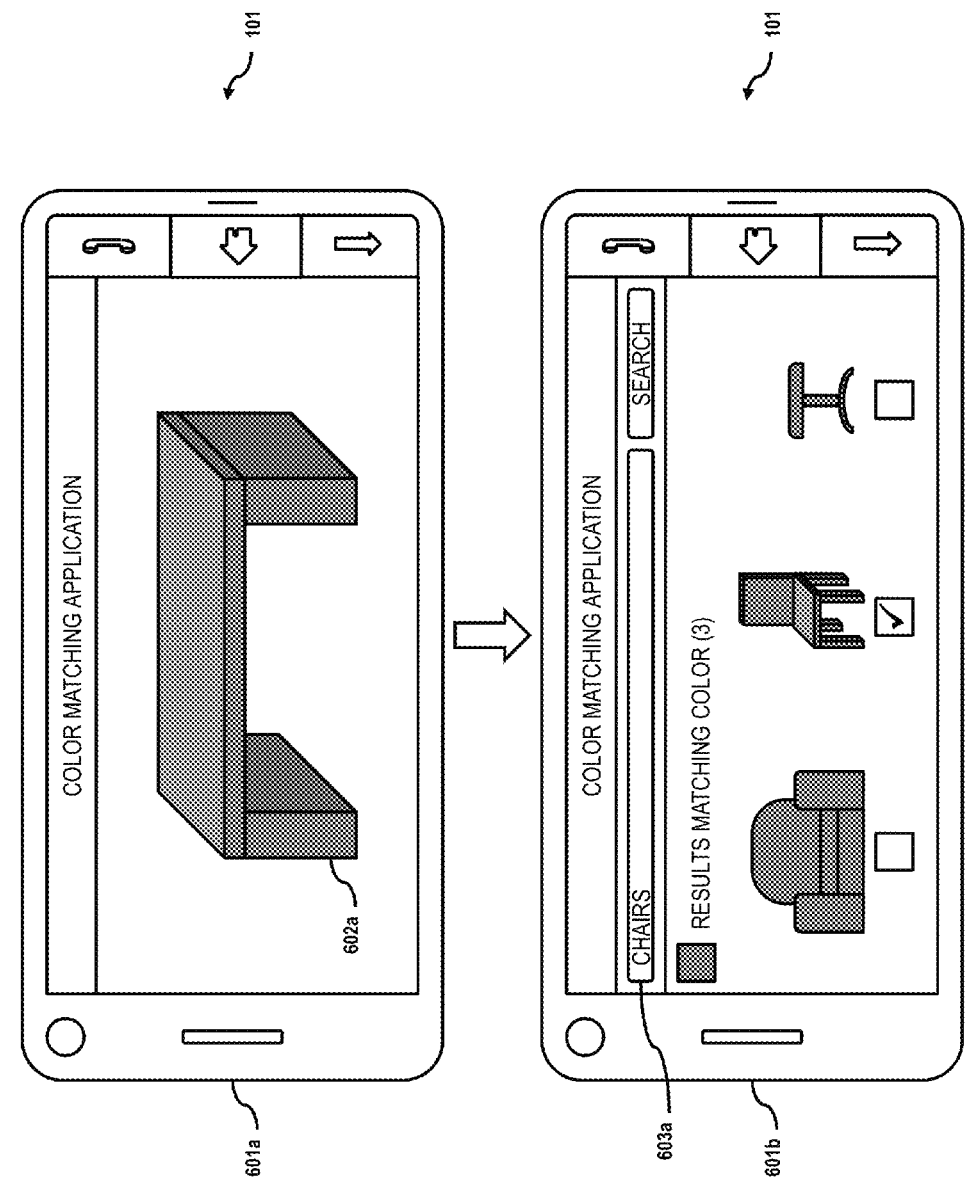
FIGS. 6A-6D are user interfaces associated with the processes illustrated in FIGS. 3-5, according to exemplary embodiments.

FIGS. 6A-6D are diagrams of user interfaces utilized in the processes of FIGS. 3-5, according to various embodiments. FIG. 6A illustrates the user interfaces 601a and 601b associated with an MD 101 when selecting an item based on color matching. The user interface 601a includes an image of, for example, a desk 602a that is a certain shade of gray. A user associated with the MD 101 and/or the desk 602a may wish to find additional physical items, such as other furniture, that matches the shade of gray of the desk. Thus, user the MD 101 and the matching application 105 associated with the MD 101, may acquire an image of the desk 602a and transmit the image to the matching platform 103. Upon performing the processing of, for example, analyzing the color of the desk 602a, the matching platform 103 returns physical items that match the color of the desk 602a (e.g., match the representation of the desk 602a). As illustrated by user interface 601b, the matching platform 103 returned chairs that match the color of the desk. In one embodiment, as illustrated in the user interface 601b, the user of the MD 101 may narrow the returned results using the indicator 603a to specific category of items, in this case, chairs. Accordingly, the returned physical items that match the representation of the desk include only chairs. Thus, FIG. 6A illustrates, for example, the ability to use the matching platform 103 to select matching furniture using an image of the piece of furniture that a user would like to match.

Figure 6B:
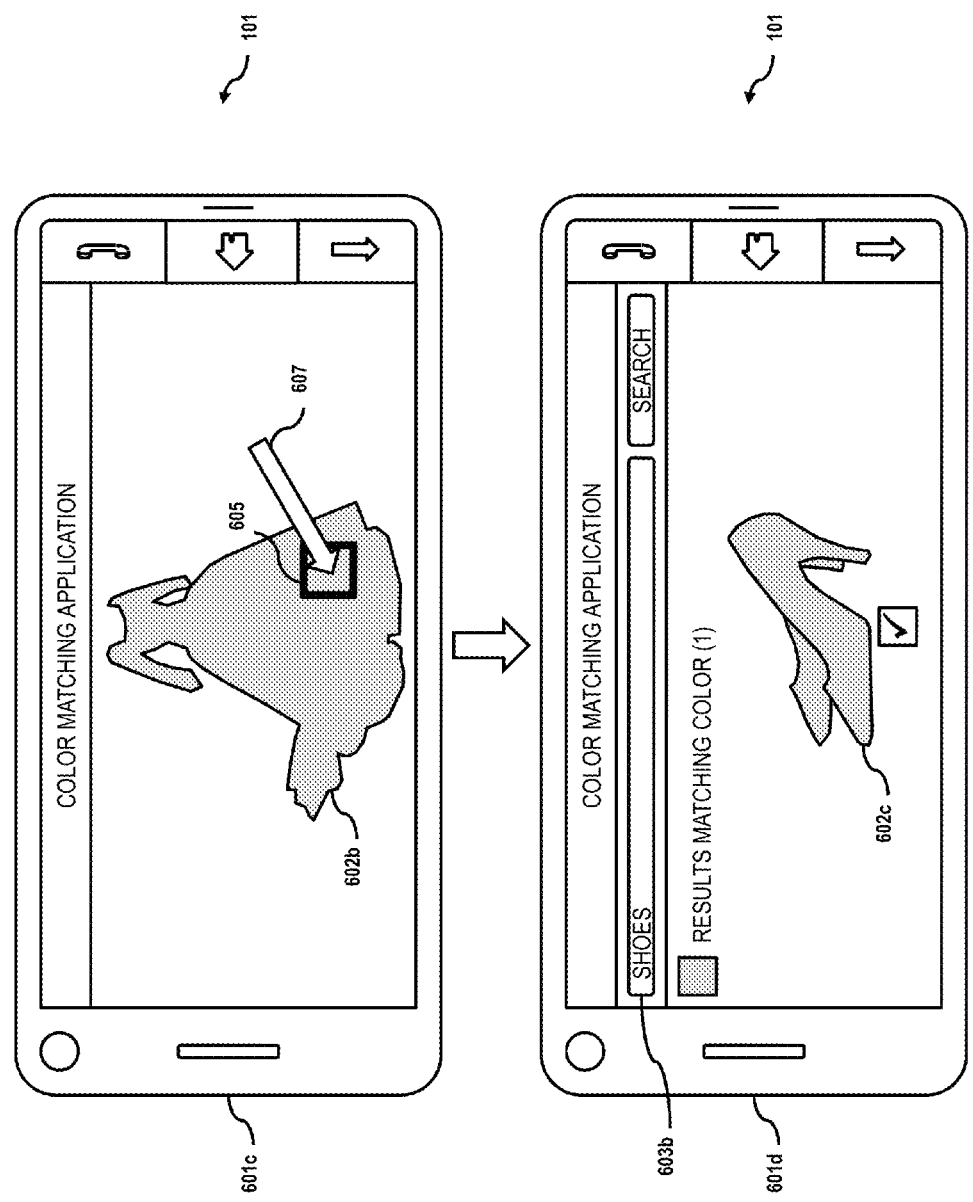

FIG. 6B illustrates the user interfaces 601c and 601d associated with an MD 101 when selecting an item based on color matching of a specific region of the item. The user interface 601c includes an image of, for example, a dress 602b that is a certain shade of gray. A user associated with the MD 101 and/or of the dress 602b may wish to find additional physical items, such as shoes, that match the shade of gray of the dress 602b. Thus, the user of the MD 101 may acquire an image of the dress 602b and transmit the image to the matching platform 103. Additional, the user may specify a region 605 of the image of the dress 602b using, for example, a cursor 607. Although the dress 602b is a single shade of gray, using the region 605, for example, allows the user to more narrowly tailor the representation of the dress 602b that is sent to the matching platform 103 for processing. Upon performing the processing of, for example, analyzing the color of the dress 602b, the matching platform 103 returns physical items that match the color of the dress 602b (e.g., match the representation of the dress). As illustrated by user interface 601d, the matching platform 103 returned a pair of shoes 602c that match the color of the dress 602b based on the user limiting the returned results to only shoes based on the indicator 603b. Thus, FIG. 6B illustrates, for example, the ability to use the matching platform 103 to select a region 605 of an object to more accurately specify the representation of the object that a user desires to match an item to based on the characteristic of the object.

Figure 6C:
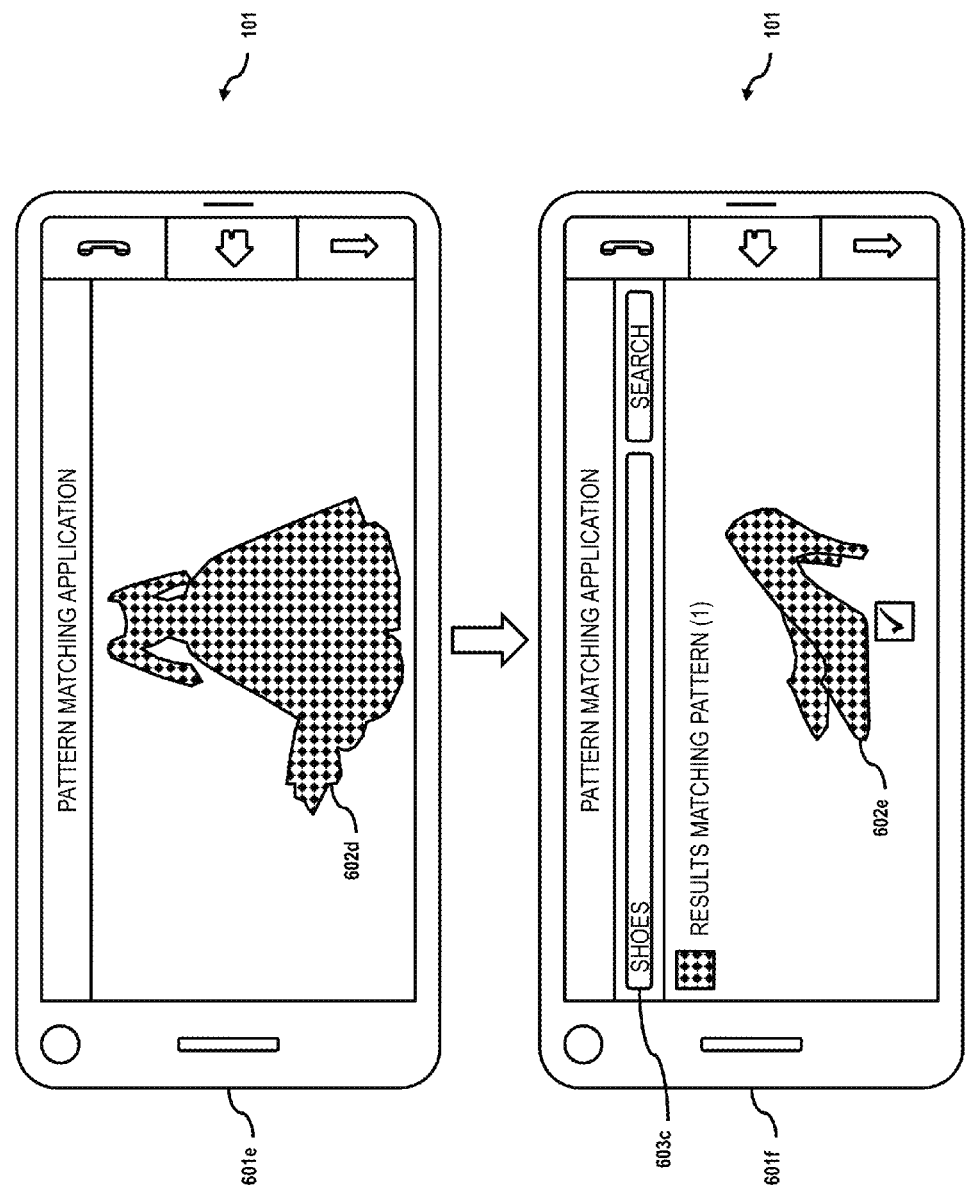

FIG. 6C illustrates the user interfaces 601e and 601f associated with an MD 101 when selecting an item based on pattern matching. The user interface 601a includes an image of, for example, a dress 602d that has a certain pattern. A user associated with the MD 101 and/or the dress 602d may wish to find additional physical items, such as shoes, that match the pattern of the dress 602d. Thus, user the MD 101 and the matching application 105 associated with the MD 101, may acquire an image of the dress 602d and transmit the image to the matching platform 103. Upon performing the processing of, for example, analyzing the pattern of the dress, the matching platform 103 returns physical items that match the pattern of the dress 602d (e.g., match the representation of the dress). As illustrated by user interface 601f, the matching platform 103 returned a pair of shoes 602e that match the pattern of the dress 602d. In one embodiment, as illustrated in the user interface 601f, the user of the MD 101 may narrow the returned results using the indicator 603c to specific category of items, in this case shoes. Accordingly, the returned physical items that match the representation (e.g., pattern) of the dress 602d include only shoes. Thus, FIG. 6C illustrates, for example, the ability to use the matching platform 103 to select matching clothing accessories using an image of the clothing that a user would like to match.

Figure 6D:
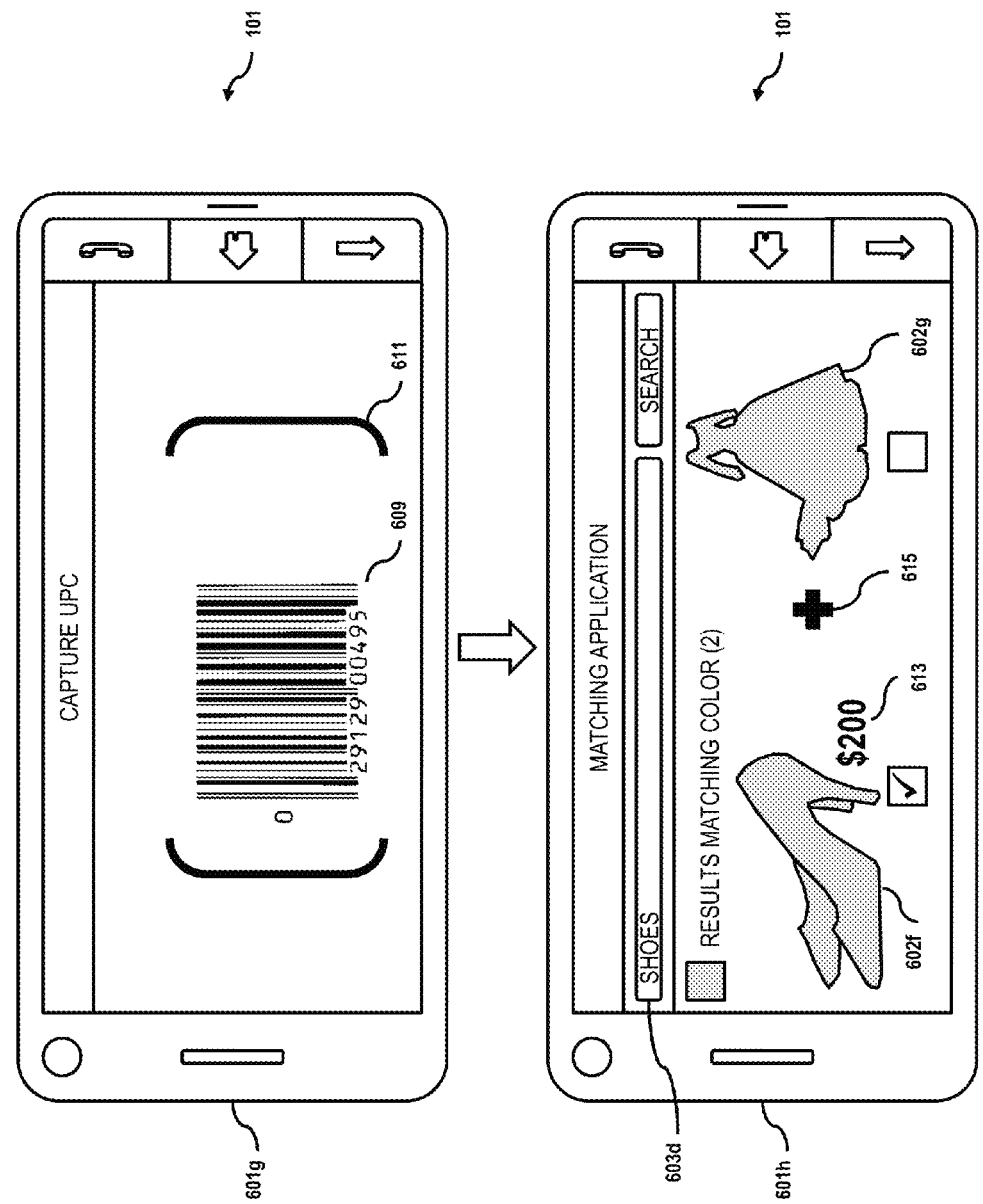

FIG. 6D illustrates the user interfaces 601g and 601h associated with an MD 101 when selecting an item based on characteristic matching based on a machine-readable code as the representation of the object. The user interface 601g includes an image of a machine-readable code 609 that was acquired, for example, by capturing an image of the machine-readable code 609 using a camera of the MD 101 and positioning the machine-readable code 609 within brackets 611. Positioning the machine-readable code 609 within the brackets, for example, allows for a large enough image of the machine-readable code for processing. Upon performing the processing of, for example, associating the machine-readable code 609 with a color and determining one or more physical items that are associated with the color, the matching platform 103 returns physical items that match the color associated with the machine-readable code 609 (e.g., representation of an object). As illustrated in user interface 601h, the matching platform 103 returned a result of a pair of shoes 602f associated with the color and within the category of shoes based on the indicator 603d. In one embodiment, the user interface 601h may include additional product description information, such as the price 613 associated with the pair of shoes 602f. In one embodiment, the user interface 601h may include one or more additional products, such as the dress 602g that the matching platform 103 recommends based on at least one of the representation of the object, and the returned item that matched the representation of the object. Such recommendation information may be based on recommendation characteristics included in the matching database 107 and/or the vendor databases 117 associated with the various products stored within the databases.

The processes described herein for item selection based on characteristic matching may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
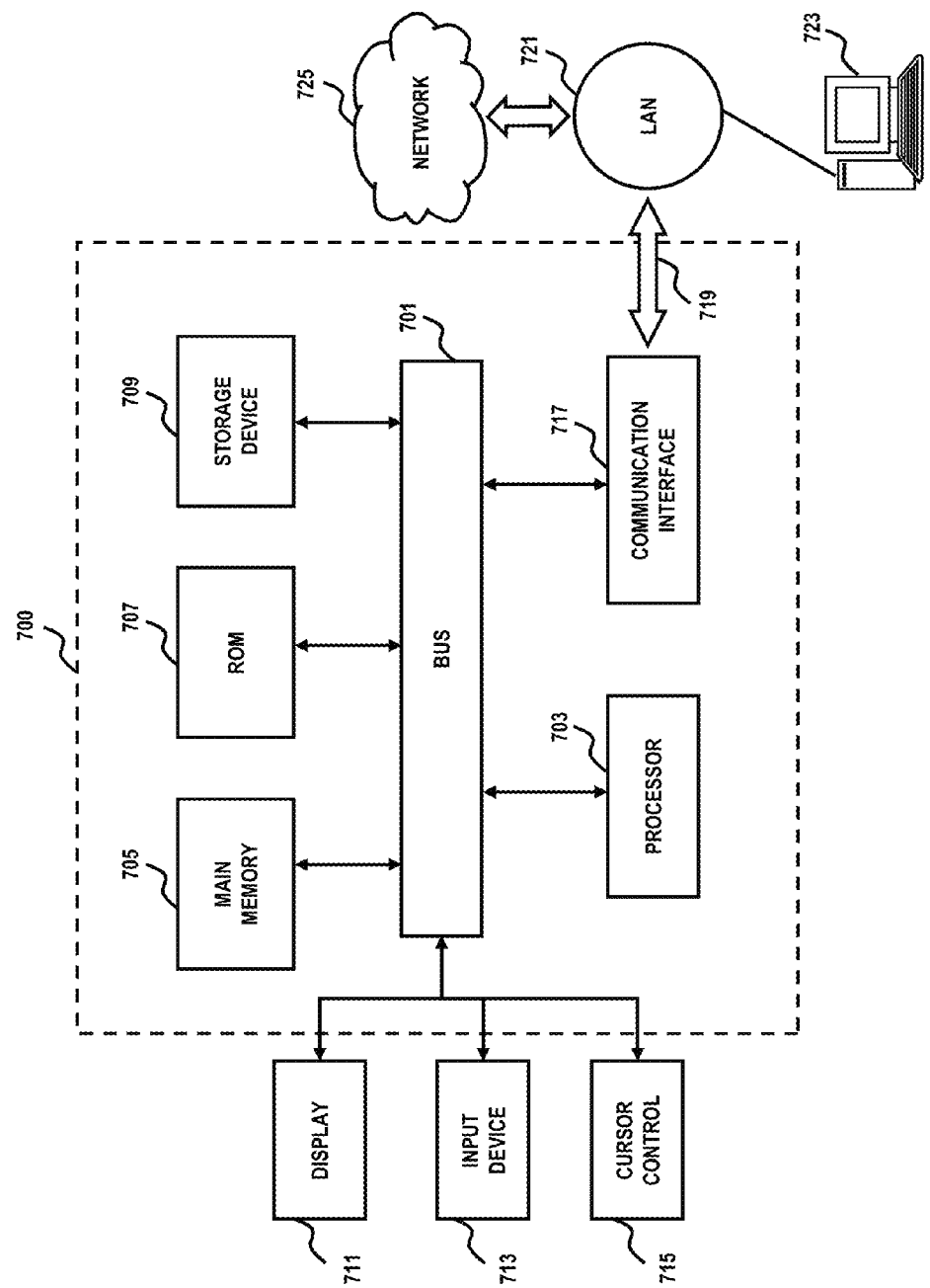
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
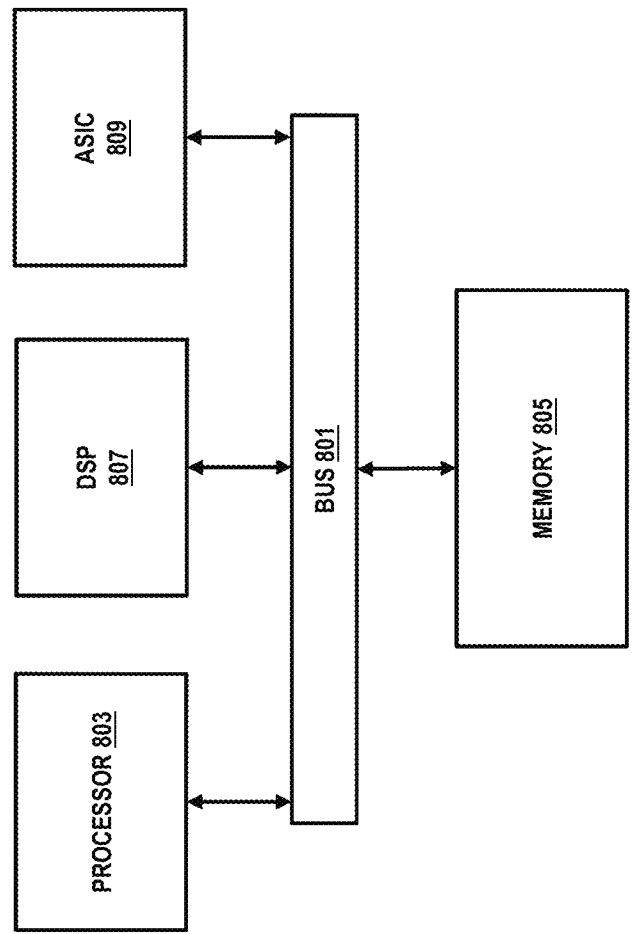
FIG. 8 is a diagram of a chip set that can be used to implement various exemplary embodiments.

FIG. 8 illustrates a chip set 800 upon which an embodiment of the invention may be implemented. Chip set 800 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 2-5.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
  capturing an image of a physical object via a mobile user device;
  in response to a user input at the mobile user device, determining by the mobile device a representation of the physical object shown in the image, the representation indicating at least one visual characteristic of a color, a texture, a pattern, or a combination thereof associated with the object;
  independently comparing by the mobile device the representation to one or more reference representations on a basis of the at least one visual characteristic;
  independently selecting by the mobile device one of the one or more of reference representations based on the comparison without user intervention; and
  in response to a subsequent user input at the mobile user device, displaying and recommending at the mobile user device one or more physical items for purchase and consumption by a user of the mobile user device, wherein the one or more physical items are shown in the one reference representation, classified in one or more product categories different from a product category of the physical object, and recommended based on the at least one visual characteristic of the physical items.

2. The method according to claim 1, further comprising:
  specifying a region of the image,
  wherein the representation of the object comprises the region.

3. The method according to claim 2, further comprising:
  determining an average of at least one of the color, the texture, and the pattern associated with the region,
  wherein the representation of the object indicates at least one of an average color, an average texture, and an average pattern.

4. The method according to claim 1, wherein the one or more physical items correspond to products associated with a vendor, and the products are classified into one or more product categories different from a product category of the physical object, the method further comprising:
  retrieving product description information associated with the determined one or more physical items; and
  presenting the product description information via the mobile user device.

5. The method according to claim 1, further comprising:
  determining at least one of a human-readable code and a machine-readable code associated with the object,
  wherein the representation of the object comprises the at least one of the human-readable code and the machine-readable code.

6. An apparatus comprising:
  a processor coupled to a memory and configured to:
    capture an image of a physical object via a mobile user device;
    in response to a user input at the mobile user device, determine a representation of the physical object shown in the image, the representation indicating at least one visual characteristic of a color, a texture, a pattern, or a combination thereof associated with the object;
    independently compare the representation to one or more reference representations on a basis of the at least one visual characteristic;
    independently select one of the one or more of reference representations based on the comparison without user intervention; and
    in response to a subsequent user input at the mobile user device, display and recommend at the mobile user device one or more physical items for purchase and consumption by a user of the mobile user device, wherein the one or more physical items are shown in the one reference representation, classified in one or more product categories different from a product category of the physical object, and recommended based on the at least one visual characteristic of the physical items.

7. The apparatus according to claim 6, wherein the processor is further configured to:
  specify a region of the image,
  wherein the representation of the object comprises the region.

8. The apparatus according to claim 7, wherein the processor is further configured to:
  determine an average of at least one of the color, the texture, and the pattern associated with the region, wherein the representation of the object indicates at least one of an average color, an average texture, and an average pattern.

9. The apparatus according to claim 6, wherein the one or more physical items correspond to products associated with a vendor, and the products are classified into one or more product categories different from a product category of the physical object, the processor further configured to:
retrieve product description information associated with the determined one or more physical items; and
present the product description information via the mobile user device.

10. The apparatus according to claim 6, wherein the processor is further configured to:
determine at least one of a human-readable code and a machine-readable code associated with the object,
wherein the representation of the object comprises the at least one of the human-readable code and the machine-readable code.

11. A system comprising:
one or more network devices stored with one or more reference representations; and
a mobile user device stored with a matching platform that is configured to:
cause, at least in part, an image of a physical object via the mobile user device;
in response to a user input at the mobile user device, determine a representation of the physical object shown in the image, the representation indicating at least one visual characteristic of a color, a texture, a pattern, or a combination thereof associated with the object;
independently compare the representation to the one or more reference representations on a basis of the at least one visual characteristic;
independently select one of the one or more of reference representations based on the comparison without user intervention; and
in response to a subsequent user input at the mobile user device, display and recommend at the mobile user device one or more physical items for purchase and consumption by a user of the mobile user device, wherein the one or more physical items are shown in the one reference representation, classified in one or more product categories different from a product category of the physical object, and recommended based on the at least one visual characteristic of the physical items.

12. The system according to claim 11, further comprising:
a database of one or more vendor products, the vendor products corresponding to the one or more physical items, and the products being classified into one or more product categories different from a product category of the physical object; and
the matching platform further configured to:
retrieve product description information associated with the determined one or more physical items; and
present the product description information via the mobile user device.

13. The system according to claim 11, wherein the mobile user device is configured to accept a specification of the region of the image, and the representation of the object comprises the region.

14. The system according to claim 13, further comprising:
the matching platform further configured to:
determine an average of at least one of the color, the texture, and the pattern associated with the region,
wherein the representation of the object indicates at least one of an average color, an average texture, and an average pattern.

* * * * *